– – –

3,428,614
ANAEROBIC ADHESIVE
Arthur M. Brownstein, Morristown, N.J., assignor to
Princeton Chemical Research, Inc., Princeton, N.J.
No Drawing. Filed Sept. 28, 1966, Ser. No. 582,537
U.S. Cl. 260—77.5    19 Claims
Int. Cl. C08g 17/10; C09j 3/16

This invention relates to anaerobic adhesive compositions. It more particularly refers to anaerobic adhesive which has residual binding power.

Anaerobic curing characteristics may be defined as the property of an polymerizable compound to polymerize rapidly and spontaneously to the solid state upon the exclusion of air or oxygen from the compound while exhibiting a long shelf life in the liquid state as long as contact with air is maintained. This property is particularly useful in the bonding or adhering of adjacent surfaces since the composition can be stored or permitted to stand in contact with air for extended periods of time without polymerizing, yet when it is deposited or placed between adjacent surfaces the accompanying exclusion of air causes the composition to polymerize and form a strong bond.

One application of anaerobic adhesives is in the lock-nut art. That is, such adhesives are suitably applied to bolt or nut threads and when the two are joined, the adhesive in the thread grooves between the nut and bolt is deprived of atmospheric oxygen and tends to adhere the nut and bolt together thus "locking" nut in place and making it less likely to come loose, particularly when the nut and bolt are subjected to vibration as is often the case where such nuts and bolts are used to fasten moving machinery.

It is known in the art to produce anaerobic adhesives from aliphatic methacrylic acid esters, particularly diesters of methacrylic acid and dihydric alcohols. It is also known that nuts and bolts joined together by many of the known anaerobic adhesives can be loosened even after the adhesive sets up by the simple expedient of applying sufficient torque to the nut and bolt to break the adhesive bond. It has been considered desirable to provide an anaerobic adhesive which possessed adhesive binding action after the initial bond has been broken. This is desirable because it is often necessary to temporarily loosen bolt and nut combinations and thereafter to retighten them. Thus, the existing anaerobic adhesives fall somewhat short with respect to this important physical property. It has only been necessary to supply sufficient torque to turn the nut for about one-half revolution in order to shatter the adhesive bond, whereas an additional full turn of the nut reduced the required nut loosening torque to about zero with the exception of the frictional forces exerted by the residue of the shattered adhesive. It has been discovered that certain anaerobic adhesives could be internally plasticized in order to impart to them the ability to retain some adhesive binding action even after the initial bond has been broken through applied torque. In co-pending U.S. application, Ser. No. 541,429, filed Mar. 9, 1966, and assigned to the same assignee as the instant application, an anaerobic adhesive composition comprising an internal plasticizer and a mixture of saturated and unsaturated diesters of pyromellitic acid, has been disclosed. This adhesive material has all of the desired anaerobic adhesive properties, in that it remains in the liquid form relatively indefinitely when exposed to oxygen and it sets up quickly to a firm adhesive bond when deprived of oxygen. This composition, in addition, has the ability to retain some adhesive strength even after the main bond strength has been destroyed, for example, by applying torque as described above.

While this previously described composition has this very desirable property of residual adhesive bond strength, it is most desirable to provide anaerobic adhesive compositions which have this property to a greater extent and thus are more valuable.

It is therefore an object of this invention to provide a novel anaerobic adhesive composition.

It is another object of this invention to provide a novel anaerobic adhesive composition which has greater residual adhesive bond strength than has heretofore been available.

Other and additional objects of this invention will become apparent from a consideration of this entire specification including the claims appended hereto.

In accord with and fulfilling these objects, one aspect of this invention includes a composition comprising a diester of a dicarbamic acid, wherein the alcoholic moiety of the ester linkage contains olefinic unsaturation in conjugation with a carbonyl group; and a mono-ester of a polycarboxylic acid containing no non-benzenoid unsaturation, wherein the alcoholic moiety of the ester linkage contains olefinic unsaturation in conjugation with a carbonyl group.

The dicarbamic acid diester of this invention is suitably of the formula:

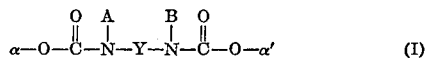

wherein A and B are the same or different and are suitably selected from the group consisting of hydrogen, alkyl, cycloalkyl, aryl, aralkyl and alkaryl; α and α' are the same or different and correspond to the formula:

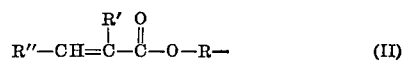

and Y is a divalent organic chemical radical.

It is preferred in the practice of this invention that Y be a hydrocarbon such as, for example, phenylene, naphthylene, bis (phenyl) alkylene, bis (alkylene) phenylene, alkyl-substituted phenylene, cycloalkylene, bis (cycloalkylene) alkylene, bis (alkyl) cycloalkylene and alkylene. Y may also be predominantly hydrocarbon with some hetero atom substitution such as bis (arylene) sulfoxides and sulfones, alkylene and arylene esters and amides, di (aryl) and (alkyl) ketones, and alkylene and arylene secondary amines. It is of course within the scope of this invention to use mixed aromatic and/or alicyclic and/or acyclic aliphatic moieties in a single embodiment of Y.

Specific illustrative divalent organic moieties which are exemplary of R (named in compound form) include benzene, naphthalene, biphenyl, cyclohexane, methane, ethane, propane, n-hexane, dodecane, methyl, hexane, alkyl ($C_1$–$C_6$) substituted benzene, bis(phenyl) ether, bis cyclohexyl ether, diethyl ether, ethyl butyl ether, methyl isobutyl ketone, diamyl amine, di-n-butyl sulfone, dimethyl sulfoxide, dihexyl thioether, benzophenone, acetophenone, ethyl acetate, dodecyl naphthenate, diphenyl methane, dicyclohexyl methane, methyl phenyl, dimethyl phenyl, tetramethyl biphenyl, etc.

In accord with this invention the substituents A and B can be exemplified by hydrogen, methyl, ethyl, butyl, 2-ethyl hexyl, dodecyl, phenyl, methyl phenyl, phenyl methyl, etc. It is preferred that both A and B be hydrogen.

The polycarboxylic acid containing no non-benzenoid unsaturation according to this invention, may be a mono- or polycyclic aromatic polycarboxylic acid of the type described above with reference to the aromatic tetracarboxylic acid. This carboxylic acid moiety has a much broader definition and includes, in addition to the tetracarboxylic acids, supra, these same aromatic moieties containing any number of carboxylic groups greater than one (1). Thus, for example, a phenyl, naphthyl, anthracyl, biphenyl or other above referred-to aromatic moiety having at least two carboxyl groups and preferably no more than about 4 carboxyl groups are suited to use in this invention. Further, the saturated moieties corresponding to these aromatic acids are also eminently well suited to use in this invention. Still further, in addition to the aromatic and alicyclic polycarboxylic acids, the acyclic polycarboxylic acids are generally useful in this invention. These moieties include polycarboxyl-substituted hydrocarbons or acyclic moieties containing hetero atoms, such as oxygen, nitrogen and/or sulfur, for example, amine polycarboxylic acids, ether polycarboxylic acids and thioether polycarboxylic acids. It is preferred in the practice of this aspect of this invention to use hydrocarbon polycarboxylic acid moieties, wherein the aromatic or alicyclic moieties if used, contain only one ring which may be alkyl-substituted as suggested above. If an acyclic aliphatic polycarboxylic acid is used, it is preferred that it contain up to about ten carbon atoms therein. In the case of alicyclic carboxylic acids, it is preferred that the ring be a cyclohexane ring. This is in no way limiting, however, since rings of about 4 to 10 carbon atoms can be conveniently used as can bicyclo materials such as octahydronaphthalene derivatives for example.

Specific compounds which are exemplary of the acid moieties intended for use in this invention (named as acids) include: pyromellitic acid; phthalic acid; terephthalic acid; naphthalene tetracarboxylic acid; anthracene tetracarboxylic acid; biphenyltetra- and dicarboxylic acids; tri(carboxyphenyl)silane; bis(carboxyphenyl)isopropane; bis(orthodicarboxyphenyl)thio ether; bis(carboxyphenyl)sulphone; tris(carboxyphenyl)methane; etc. It is of course understood that the tetracarboxy acids are useful in producing both the diester and the monoester components of the composition of this invention, whereas the di- and tricarboxylic acids are only intended for use in preparing the monoester component.

As stated above, the alcoholic moiety of both of the mono- and diesters of this invention has conjugated carbonyl and olefin groups. This alcoholic moiety generally corresponds to the structural formula:

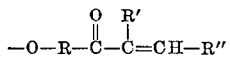

wherein both the R' and R'' are hydrocarbons containing up to about six carbon atoms; and wherein R may be an alkylene, alkyleneoxy, alkyleneamino group, or one of said groups containing an oxygen or sulfur hetero atom linkage therein.

The moieties R' and R'' are suitably exemplified by hydrogen, methyl, ethyl, n-butyl, etc.

The moiety R is suitably exemplified by

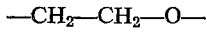

in which case the alcoholic moiety (named as an alcohol) would be a hydroxyethyl acrylate in the case where R' and R'' are both hydrogen. The above-identified ethylene linkage may be propylene or isopropylene or for that matter substantially any alkylene group having up to about 16 carbon atoms in the straight chain extending between the indicated oxygen atoms.

Additionally R is suitably exemplified by

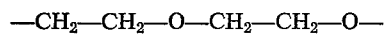

in which case the alcoholic moiety (named as an alcohol) would be diethylene glycol monoacrylate in the case where R' and R'' are both hydrogen. The above-identified di(ethylene oxy) linkage may be di(propylene oxy), di(isopropylene oxy) or for that matter substantially any di(alkylene oxy) group having up to about 6 carbon atoms in the alkylene group.

It is also within the scope of this invention to provide oligomeric ethers as the R group, for example, polyethylene oxide, polypropylene oxide, higher homologous alkylene oxide oligomers or alkylene oxide oligomers having mixed alkylene group mer units therein. It is preferred in the case of these oligomers to provide up to about 16 mer units of appropriate alkyleneoxy groups therein.

Further, it is within the scope of this invention to substitute a sulfur or nitrogen atom for the oxygen atom in the alkylene ether oligomer so as to provide an alkylene thioether oligomer or an alkylene amine oligomer otherwise having the same definition and exemplary components as recited above. Thus, the simplest example of this type of compound would be:

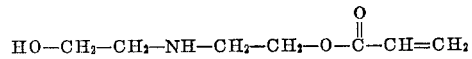

or

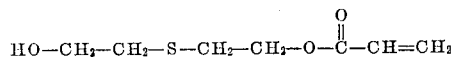

The alcoholic moieties of this invention may further be exemplified by the amide reaction products of aminoalcohols and α–β olefinically unsaturated acids, such as for example, N-hydroxyethyl acrylamide. In this regard, all of the above-defined exemplary compounds and compound constituents, are included in the definition and exemplification of this group of alcoholic moieties with the provisio that an amide linkage join the unsaturation to the remainder of the alcoholic moiety.

It is further within the scope of this invention to provide as the alcoholic moiety an unsaturated ketone in which case R in the above formula would be an alkylene group having substantially the same definition as the alkylene defined above, but without the presence of an oxygen, sulfur or nitrogen hetero atom in the chain between the carbonyl group conjugated with the olefinic unsaturation and the ester group joining the aromatic carboxylic acid.

It is preferred in the practice of this invention to incorporate into the anaerobic adhesive composition hereof, a vinyl polymerization catalyst. These materials are per se quite well known in the art. They may be exemplified by various per compounds, such as, for example, cumene hydroperoxide, benzyl hydroperoxide, t-butyl hydroperoxide, methyl ethyl ketone hydroperoxide, cyclohexanone hydroperoxide, sodium peroxide and persulfate, other metallic persulfate salts, various percarbonates and perborates, etc.

The mole ratio of mono-ester to di-carbamic acid esters in the adhesive composition of this invention may range from about 99:1 to about 1:1, and is preferably about 50:1 to 2.5:1.

The amount of vinyl polymerization catalyst may vary from about 0.1 to about 5%, and is preferably about 0.5 to about 2.5% by weight of the total ester in the adhesive composition.

The carboxylic acid mon-ester and the di-carbamic acid ester may be prepared separately by known procedures and then blended in the proper mole ratios.

In a preferred embodiment of the invention, the adhesive composition is prepared by first reacting tolylene-2,4-diisocyanate in toluene with 2-hydroxyethylmethacrylate to form the bis (urethane ester) viz.:

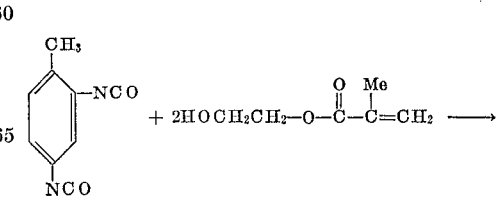

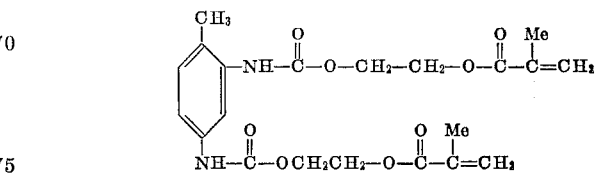

The resulting bis (urethane ester) is isolated by evaporation of the toluene and then mixed with a monoester of phthalic anhydride and 2-hydroxyethylmethacrylate, e.g.,

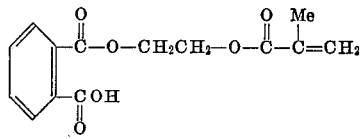

in a mole ratio of 8:1 in favor of the latter. The viscous mixture is combined with 2 weight percent of a vinyl polymerization catalyst.

The adhesive composition, even after the addition of catalyst, has almost unlimited shelf life in the presence of air, but will cure to a tenacious adhesive when exposure to air is prevented.

To set the adhesive, it is generally only necessary to confine it between the surfaces to be bonded, preferably in the presence of metal ions. Sufficient air is excluded by this action to permit the adhesive to cure. The addition of metal ions, such as iron, zinc, cobalt or cadmium generally serve to accelerate the curing action.

The adhesive will set over a wide range of temperatures, from 0° to 200° C., and preferably from 15 to 125° C. Curing action is more rapid at elevated temperatures.

The following examples are given by way of illustration of the instant invention without in any way being limiting thereon. Parts and percentages given are by weight and temperatures are in degrees centigrade unless specified to the contrary.

Example 1

A reactor was charged with 2,4-tolylene diisocyanate (8.7 parts) dry toluene (75 parts) and 2-hydroxyethylmethacrylate (13.0 parts). The mixture was treated with pyridine (0.1 part) and heated at 100° for 30 minutes. The toluene was removed in vacuo and the residue was combined with the half ester of phthalic anhydride and 2-hydroxyethylmethacrylate (103 parts). To the syrupy mixture was added α-cumene hydroperoxide (2 parts).

The adhesive mixture was coated onto a ⅜" zinc-plated carriage bolt, the nut applied and allowed to stand at 25° for 18 hours. Similar treatment was accorded to other zinc-plated nuts and bolts treated with a commercial anaerobic adhesive comprised of an aliphatic diester of 2-hydroxyethylmethacrylate (product of the Loctite Corp. of Newington, Conn.). The torque required to turn the nuts about the bolts was measured per half revolution by turning the nut first 2 full revolutions in a counter-clockwise direction, and then 2 full revolutions in a clockwise direction. The superiority of the adhesive of this invention is manifest by its maintenance of superior torque.

TABLE I

| Run | Degrees of Turn | | | | | | | |
|---|---|---|---|---|---|---|---|---|
| | +180 | +360 | +540 | +720 | −180 | −360 | −540 | −720 |
| | Torque, ft.-lbs. | | | | | | | |
| Example 1 | 12.5 | 11.0 | 8.0 | 7.5 | 6.0 | 7.0 | 6.0 | 5.0 |
| Loctite C | 17.5 | 5.0 | 2.5 | 2.5 | 1.5 | 2.0 | 2.0 | 2.5 |
| Loctite H | 5.0 | 2.5 | 2.0 | 2.0 | 2.0 | 1.5 | 1.5 | 1.5 |

Example 2

Application of the adhesive of Example 1 was made to strips of polyethylene terephthalate polyester film and to melamine-formaldehyde blocks. After 1 hour at 100° C., a bond strentgh of 113 p.s.i. was obtained with the former and 325 p.s.i. with the latter. Loctite C failed to supply any adhesion in either instance.

Example 3

Similar results to Examples 1 and 2 are obtained with the following adhesive compositions.

A. 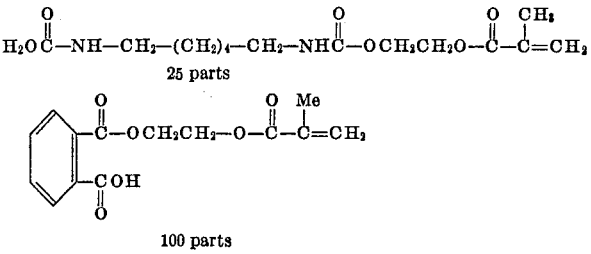

25 parts

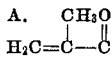

100 parts

α-cumene hydroperoxide (2 parts).

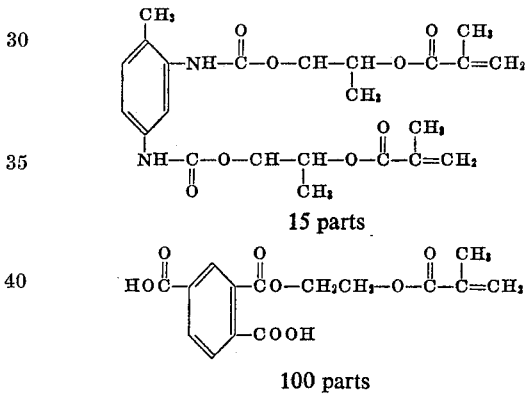

15 parts 100 parts toluene (10 parts) and α-cumene hydroperoxide (3 parts).

What is claimed is:

1. A composition suitable for use as an anaerobic adhesive comprising a mixture of (1) a diester of a dicarbamic acid, wherein the alcoholic moiety of said ester contains a carbonyl group in conjugation with an olefinic unsaturation; and (2) a mono-ester of a polycarboxylic acid, wherein the alcoholic moiety of said ester contains a carbonyl in conjugation with an olefinic unsaturation.

2. A composition claimed in claim 1, wherein said diester of a dicarbamic acid corresponds to the formula:

$$\alpha-O-\overset{O}{\underset{\|}{C}}-\overset{A}{\underset{|}{N}}-Y-\overset{B}{\underset{|}{N}}-\overset{O}{\underset{\|}{C}}-O-\alpha'$$

wherein A and B are each selected from the group consisting of hydrogen, alkyl, cycloalkyl, aryl, aralkyl and alkaryl; α and α' correspond to the formula:

$$R''-CH=\overset{R'}{\underset{|}{C}}-\overset{O}{\underset{\|}{C}}-O-R-$$

wherein R' and R" are each selected from the group consisting of hydrogen and a hydrocarbon radical, and R is a divalent organic chemical radical; and Y is a divalent organic chemical reactant.

3. A composition as claimed in claim 2, wherein Y is a member selected from the group consisting of phenylene, naphthylene, bis (phenylene) alkylene, bis (alkylene) phenylene, alkylphenylene, cycloalkylene, bis (cycloalkylene) alkylene, bis (alkylene cycloalkylene and alkylene.

4. A composition as claimed in claim 3, wherein A and B are the same.

5. A composition as claimed in claim 3, wherein A and B are hydrogen.

6. A composition as claimed in claim 3, where α and α' are the same.

7. A composition as claimed in claim 3, wherein α and α' are acrylic acid ester derivatives.

8. A composition as claimed in claim 3, wherein R is a member selected from the group consisting of alkylene, alkyleneoxy, alkylene amino, polyalkylene ether, polyalkylene thioether and polyalkylene amine.

9. A composition claimed in claim 8, wherein said R' is methyl and said R" is hydrogen.

10. A composition claimed in claim 8, wherein said alkylene has about 2 to about 16 carbon atoms therein.

11. A composition claimed in claim 8, wherein said R has up to about 16 repeating alkylene ether mer units.

12. A composition claimed in claim 1, wherein said monoester is the reaction product of pyromellitic dianhydride and at least one member selected from the group consisting of hydroxyethyl monomethacrylate and hydroxyisopropyl monomethacrylate.

13. A composition claimed in claim 1, wherein said monoester is the reaction product of phthalic anhydride and at least one member selected from the group consisting of hydroxyethyl monomethacrylate and hydroxyisopropyl monomethacrylate.

14. A composition claimed in claim 1, wherein the alcoholic moieties of both said mono- and diesters are the same.

15. A composition claimed in claim 1, containing a vinyl polymerization catalyst.

16. A composition claimed in claim 15, wherein said vinyl polymerization catalyst comprises about 0.1 to 5 weight percent of said composition.

17. A composition claimed in claim 15, wherein said vinyl polymerization catalyst comprises about 0.5 to 2.5 weight percent of said composition.

18. A composition claimed in claim 1, wherein the mole ratio of monoester to diester of a dicarbamic acid is about 99:1 to 1:1.

19. A composition claimed in claim 1, wherein the mole ratio of monoester to diester of a dicarbamic acid is about 50:1 to 2.5:1.

References Cited

UNITED STATES PATENTS 3,150,118 9/1964 Clemens.
3,336,360 8/1967 Dill.
3,336,418 8/1967 Dill.

JOSEPH L. SCHOFER, *Primary Examiner.*

J. KIGHT III, *Assistant Examiner.*

U.S. Cl. X.R.

260—471, 78.5; 151—7, 14.5, 41.7